US011451592B2

United States Patent
Shi et al.

(10) Patent No.: US 11,451,592 B2
(45) Date of Patent: Sep. 20, 2022

(54) METHOD AND APPARATUS FOR USER COMMUNICATION IN LIVE STREAM ROOM, DEVICE AND STORAGE MEDIUM

(71) Applicant: BEIJING BAIDU NETCOM SCIENCE AND TECHNOLOGY CO., LTD., Beijing (CN)

(72) Inventors: Nansheng Shi, Beijing (CN); Malin Xie, Beijing (CN); Jiao Cao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/215,325

(22) Filed: Mar. 29, 2021

(65) Prior Publication Data
US 2021/0234905 A1 Jul. 29, 2021

(30) Foreign Application Priority Data
Jul. 21, 2020 (CN) .......................... 202010714379.8

(51) Int. Cl.
*H04L 65/1069* (2022.01)
*H04L 65/1093* (2022.01)
*H04L 65/401* (2022.01)

(52) U.S. Cl.
CPC ...... *H04L 65/1069* (2013.01); *H04L 65/1093* (2013.01); *H04L 65/4015* (2013.01)

(58) Field of Classification Search
CPC ............. H04L 65/1069; H04L 65/1093; H04L 65/4015
See application file for complete search history.

(56) References Cited

U.S. PATENT DOCUMENTS

| 7,480,259 B2 * | 1/2009 | Covell | H04L 65/403 |
| | | | 370/260 |
| 7,840,224 B2 * | 11/2010 | Vengroff | H04L 67/18 |
| | | | 455/456.2 |

(Continued)

FOREIGN PATENT DOCUMENTS

| CN | 104363476 A | 2/2015 |
| CN | 104468335 A | 3/2015 |

(Continued)

OTHER PUBLICATIONS

Preeti Bhatt, "MongoDB vs Redis: Critical Analysis and Comparison", International Journal of New Innovations in Engineering and Technology, Oct. 2017. (Year: 2017).*

(Continued)

*Primary Examiner* — Nam T Tran
(74) *Attorney, Agent, or Firm* — Kilpatrick Townsend & Stockton LLP (57) ABSTRACT

A method for user communication in a live stream room, apparatus, electronic device and medium are provided. An implementation of the method may include: in response to a request for creating a discussion group from a primary user, determining target secondary users from other participants in the live stream room except the primary user; sending an invitation message to the target secondary users for inviting the target users to join the discussion group; and creating the discussion group, with the primary user and a target secondary user who confirms joining as members of the discussion group, and associating thereto a user identification of the primary user, a user identification of a target secondary user who confirms joining, and an identification of the discussion group, to conduct an inner-group discussion among the members of the discussion group on the basis of the discussion group.

17 Claims, 7 Drawing Sheets

(56) References Cited

U.S. PATENT DOCUMENTS

| | | | |
|---|---|---|---|
| 9,002,379 B1* | 4/2015 | Yang | H04L 67/18 |
| | | | 455/414.1 |
| 9,420,108 B1* | 8/2016 | Bostick | H04L 65/403 |
| 9,456,235 B1 | 9/2016 | Greenfield | |
| 10,117,075 B1* | 10/2018 | Nordstrom | H04L 67/306 |
| 2002/0181683 A1* | 12/2002 | Mani | H04L 65/1069 |
| | | | 379/201.01 |
| 2005/0113123 A1* | 5/2005 | Torvinen | H04L 67/16 |
| | | | 455/518 |
| 2007/0203980 A1 | 8/2007 | Andersen | |
| 2014/0267550 A1 | 9/2014 | Nimri et al. | |
| 2014/0362165 A1* | 12/2014 | Ackerman | H04L 65/4023 |
| | | | 348/14.07 |
| 2018/0359293 A1* | 12/2018 | Faulkner | H04L 65/403 |

FOREIGN PATENT DOCUMENTS

| | | | |
|---|---|---|---|
| CN | 108062375 A | 5/2018 | |
| CN | 109714609 A | 5/2019 | |
| CN | 110324228 A | 10/2019 | |
| CN | 111314728 A | 6/2020 | |

OTHER PUBLICATIONS

Lihao Ni, Yanshin Liu, and Yi Liu, "Privacy Protection Model for Location-Based Services", Journal of Information Processing Systems, Feb. 2020. (Year: 2020).*

Wang, Dennis et al., "I Love the Feeling of Being on Stage, but I Become Greedy": Exploring the Impact of Monetary Incentives on Live Streamers' Social Interactions and Streaming Content, Proceedings of the ACM on Human-Computer Interaction, ACMPUB27, New York, NY, USA, vol. 3, No. CSCW, pp. 1-24, (Nov. 7, 2019).

Extended European Search Report dated Sep. 14, 2021 in corresponding European Patent Application No. 21163892.9 (ten pages).

* cited by examiner

METHOD AND APPARATUS FOR USER COMMUNICATION IN LIVE STREAM ROOM, DEVICE AND STORAGE MEDIUM

CROSS-REFERENCE TO RELATED APPLICATIONS

This application claims priority to Chinese Patent Application No. 202010714379.8 filed with the China National Intellectual Property Administration (CNIPA) on Jul. 21, 2020, the content of which is incorporated herein by reference in its entirety.

TECHNICAL FIELD

The present disclosure relates to the field of data processing technology, in particular to artificial intelligence, information streaming, and live stream technology, and more particular to a method and apparatus for user communication in a live stream room, a device, and a storage medium.

BACKGROUND

With the rapid development of the live stream industry, more and more users like to watch live streams. While watching a live stream content in a live stream room, a user may also interact with the anchor in the live stream room. An interaction method is generally: initiating a comment or a live commenting to the anchor. This kind of interaction is monotonous and reduces interaction between users.

SUMMARY

Embodiments of the present disclosure disclose a method and apparatus for user communication in a live stream room, a device, and a storage medium.

According to a first aspect of the present disclosure, a method for user communication in a live stream room is provided. The method includes: in response to a request for creating a discussion group from a primary user, determining target secondary users from other participants in the live stream room except the primary user; sending an invitation message to the target secondary users for inviting the target users to join the discussion group; and creating the discussion group, with the primary user and a target secondary user who confirms joining as members of the discussion group, and associating thereto a user identification of the primary user, a user identification of the target secondary user who confirms joining, and an identification of the discussion group, to conduct an inner-group discussion among the members of the discussion group on the basis of the discussion group.

According to a second aspect of the present disclosure, an apparatus for user communication in a live stream room is provided. The apparatus includes: a user determination module, configured to determine target secondary users from other participants in the live stream room except the primary user in response to a request for creating a discussion group of a primary user; a message sending module, configured to send an invitation message to the target secondary users for inviting the target users to join the discussion group; and a discussion group creation module, configured to create the discussion group, with the primary user and a target secondary user who confirms joining as members of the discussion group, and associate thereto a user identification of the primary user, a user identification of the target secondary user who confirms joining, and an identification of the discussion group, to conduct an inner-group discussion among the members of the discussion group on the basis of the discussion group.

According to a third aspect of the present disclosure, an electronic device is provided. The electronic device includes: at least one processor; and a memory, communicatively connected to the at least one processor; where, the memory, storing instructions executable by the at least one processor, the instructions, when executed by the at least one processor, cause the at least one processor to perform the method according to any one of embodiments of the first aspect.

According to a fourth aspect of the present disclosure, a non-transitory computer readable storage medium is provided. The non-transitory computer readable storage medium, stores computer instructions thereon, the computer instructions, when executed by a processor, cause the processor to perform the method according to any one of embodiments of the first aspect.

The technology according to the present disclosure improves user interaction in a live stream room.

It should be understood that the content described in this section is not intended to identify key or important features of the embodiments of the present disclosure, nor is it intended to limit the scope of the present disclosure. Other features of the present disclosure will be easily understood by the following description.

BRIEF DESCRIPTION OF THE DRAWINGS

The accompanying drawings are used to better understand the present solution and do not constitute a limitation to the present disclosure, in which.

DETAILED DESCRIPTION OF EMBODIMENTS

The following describes example embodiments of the present disclosure with reference to the accompanying drawings, which include various details of the embodiments of the present disclosure to facilitate understanding, and should be regarded as merely exemplary. Therefore, those of ordinary skill in the art should realize that various changes and modifications may be made to the embodiments described herein without departing from the scope and spirit of the present disclosure. Likewise, for clarity and conciseness, descriptions of well-known functions and structures are omitted in the following description.

Figure 1:
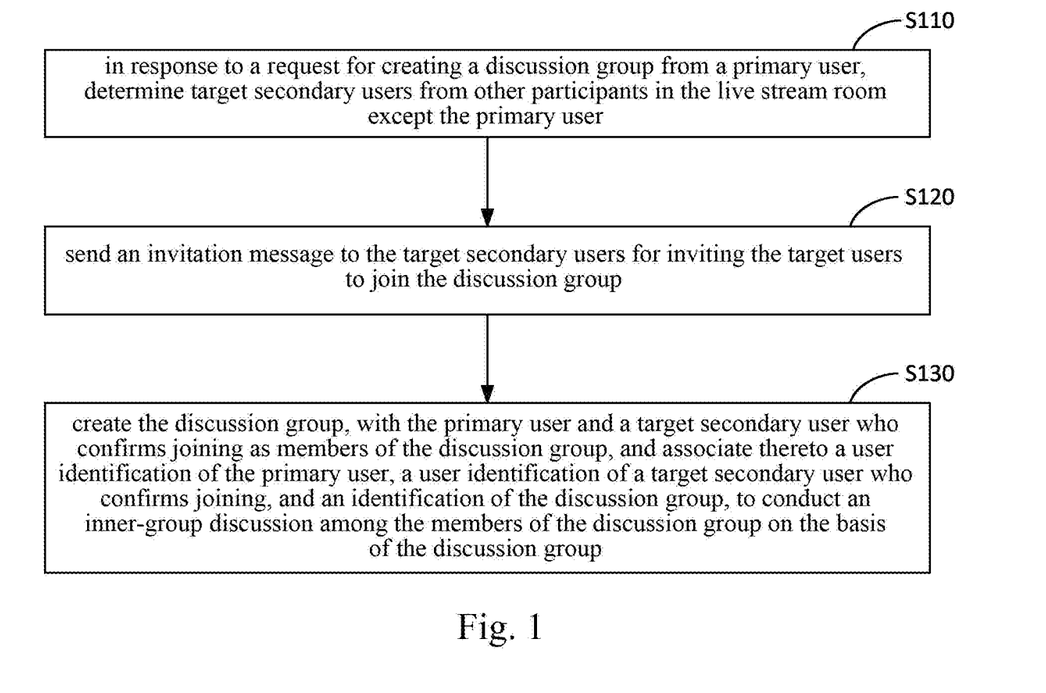
FIG. 1 is a flowchart of a method for user communication in a live stream room according to an embodiment of the present disclosure.

FIG. 1 is a flowchart of a method for user communication in a live stream room according to an embodiment of the present disclosure. Embodiments of the present disclosure are applicable to a situation where a discussion group is created for participants of a live stream to facilitate user communication. Typically, embodiments of the present disclosure are applicable to a situation where a discussion group is created during a live stream for a plurality of audiences to discuss the content of the live stream. The method may be performed by an apparatus for user communication in a live stream room, and the apparatus may be implemented by software and/or hardware. Referring to FIG. 1, the method for user communication in a live stream room according to an embodiment of the present disclosure may include:

S110, in response to a request for creating a discussion group from a primary user, determine target secondary users from other participants in the live stream room except the primary user.

Here, the primary user refers to a participant in the live stream room who initiates the request for creating a discussion group.

Participants in the live stream room are those who participate in the live stream. Participants in the live stream room may include an anchor and an audience.

Any participant in the live stream room may initiate the request for creating a discussion group.

In an embodiment, the audience in the live stream room may initiate the request for creating a discussion group; alternatively, the anchor in the live stream room may also initiate the request for creating a discussion group.

A discussion group refers to any group of online users having same attributes and communicating in a certain method.

For example, the discussion group may be composed of at least two participants in the live stream room having the same interests.

The target secondary user is a user who joins the discussion group in response to the request for creating a discussion group of the primary user. The target secondary user may be the anchor of the live stream or an audience of the live stream.

S120, sending an invitation message to the target secondary users for inviting the target users to join the discussion group.

S130, creating the discussion group, with the primary user and a target secondary user who confirms joining as members of the discussion group, and associating thereto a user identification of the primary user, a user identification of a target secondary user who confirms joining, and an identification of the discussion group, to conduct an inner-group discussion among the members of the discussion group on the basis of the discussion group.

In an embodiment, the creating the discussion group may include: creating an identification of the discussion group, and allocating storage space for the discussion group, for storing an association relationship between the user identification of the primary user, the user identification of the target secondary user who confirms joining, and the identification of the discussion group.

In an embodiment of the present disclosure, by determining the target secondary users from the other participants in the live stream room except the primary user in response to a request for creating a discussion group from the primary user, creating the discussion group, and associating thereto the user identification of the primary user, the user identification of the target secondary user who confirms joining, and the identification of the discussion group, so that the discussion group including the primary user and the target secondary user who confirms joining is created, then the communication between the members of the discussion group is realized based on the discussion group, and user interaction in the live stream room is improved.

In addition, by determining target secondary users, and sending the invitation message to the target secondary users for inviting the target secondary users to join the discussion group, so that interruption to a non-target secondary user is avoided.

In order to reduce the use of the storage space, if a live stream associated with the live stream room ends, the association relationships between the user identifications of the primary user and the target secondary user who confirms joining and the identification of the discussion group are deleted.

Figure 2:
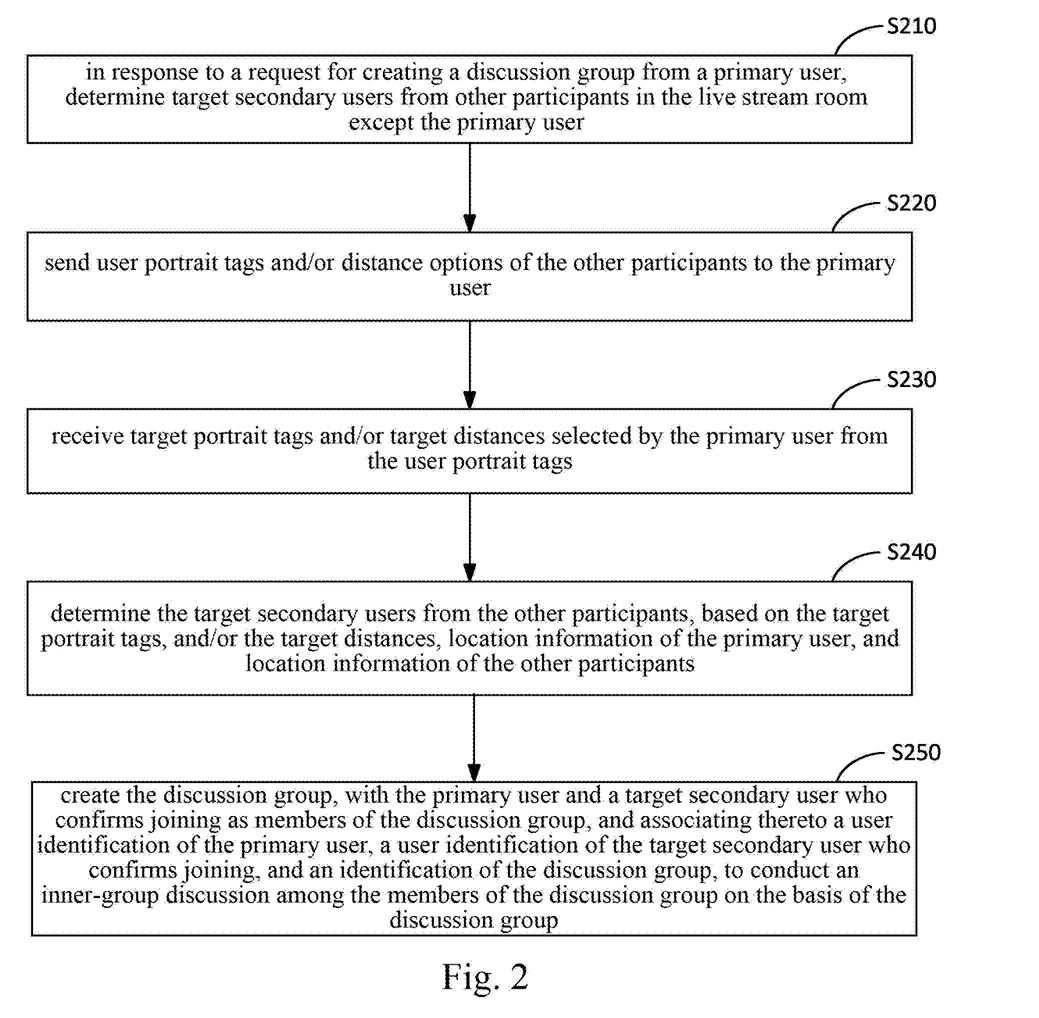
FIG. 2 is a flowchart of a method for user communication in a live stream room according to another embodiment of the present disclosure.

FIG. 2 is a flowchart of a method for user communication in a live stream room according to an embodiment of the present disclosure. The present solution is an optimization of the above step "determining target secondary users from other participants in a live stream room except the primary user" on the basis of the above solution. Referring to FIG. 2, the method for user communication in a live stream room provided by an embodiment of the present solution may include:

S210, in response to a request for creating a discussion group from a primary user, determining target secondary users from other participants in the live stream room except the primary user.

S220, sending user portrait tags and/or distance options of the other participants to the primary user.

Here, the user portrait tag refers to a tag that describes a specific profile of a user. In an embodiment, the user portrait tag may be a hobby, an age range, gender, an occupation, and so on.

For example, a user portrait tag may be, such as, like playing basketball, age between 25 and 35 years old, male, and the like.

The distance option refers to an option that describes a maximum distance between the primary user and a target secondary user.

In an embodiment, the distance option may be within 100 meters, within 200 meters, etc. from the primary user.

S230, receiving target portrait tags and/or target distances selected by the primary user from the user portrait tags.

Here, the target portrait tag refers to a user portrait tag selected by the primary user, or may also be understood as a user portrait tag that matches a target secondary user.

The target distance may refer to a distance option selected by the primary user, or may also be understood as the maximum or minimum value of a distance between a target secondary user and the primary user.

Step 240, determining the target secondary users from the other participants, based on the target portrait tags, and/or the target distances, location information of the primary user, and location information of the other participants.

In an embodiment, the target secondary users may be determined from the other participants based on the target portrait tags; or the target secondary users may also be determined from the other participants based on the target distances, the location information of the primary user, and the location information of the other participants; or the target secondary users may also be determined from the other participants, based on the target portrait tags and the target distances, the location information of the primary user, and the location information of the other participants.

The determining the target secondary users from the other participants, based on the target portrait tags, may include:

matching the target portrait tags with the user portrait tags of the other participants; and selecting the target secondary users from the other participants based on a result of the matching.

The determining the target secondary users from the other participants, based on the target distances, the location information of the primary user, and the location information of the other participants, may include:

calculating distances between the primary user and the other participants, based on the location information of the primary user and the location information of the other participants;

matching the calculated distances with the target distances; and selecting the target secondary users from the other participants, based on a matching result.

S250, creating the discussion group, with the primary user and a target secondary user who confirms joining as members of the discussion group, and associating thereto a user identification of the primary user, a user identification of the target secondary user who confirms joining, and an identification of the discussion group, to conduct an inner-group discussion among the members of the discussion group on the basis of the discussion group.

The present solution sends the user portrait tags and/or the distance options of the other participants in the live stream room except the primary user to the primary user, determines the target secondary users from the other participants, based on the target portrait tags selected by the primary user, and/or, based on the location information of the primary user, the location information of the other participants and the target distances selected by the primary user, thereby assisting the user in determining the target secondary users, and improving the efficiency of determining the target secondary users. This beneficial effect is particularly obvious when the number of participants in the live stream room is large.

Figure 3:
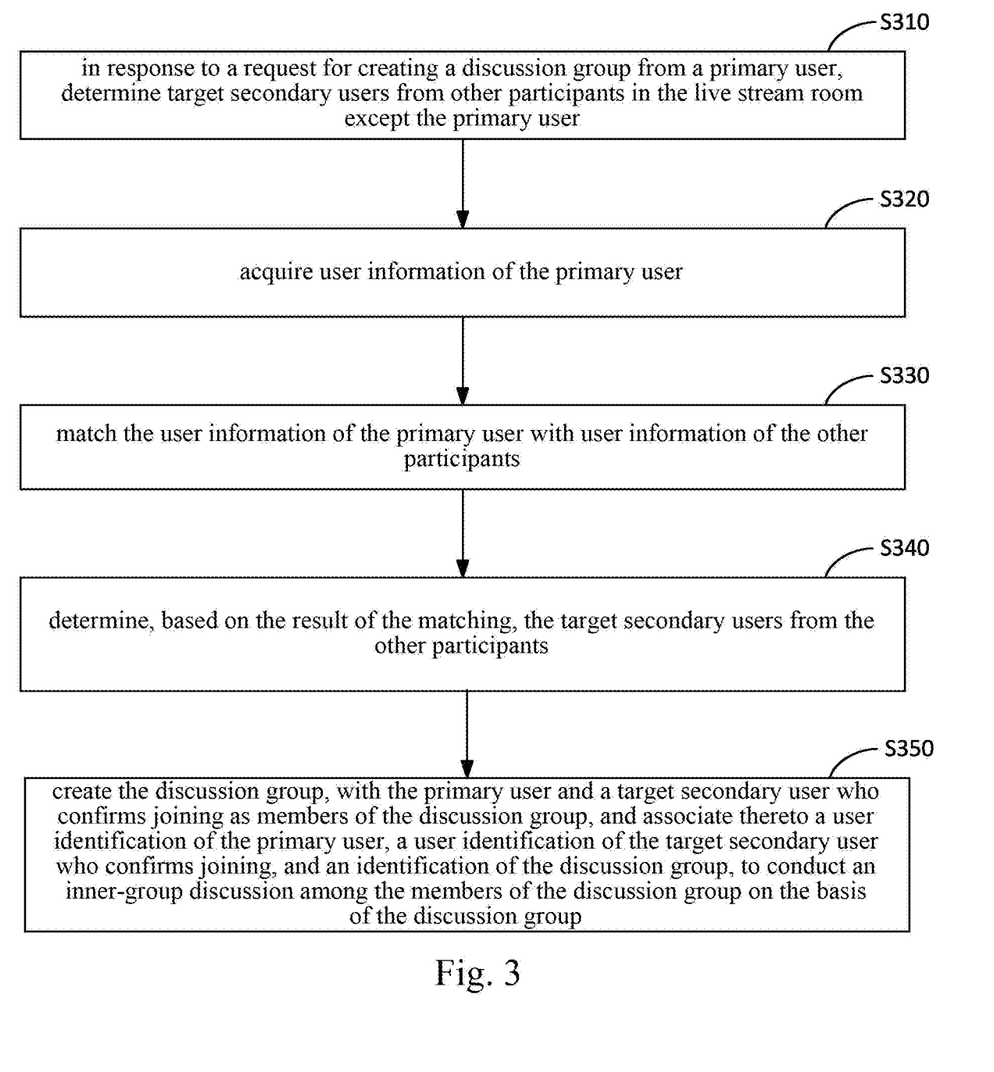
FIG. 3 is a flowchart of yet a method for user communication in a live stream room according to another embodiment of the present disclosure.

FIG. 3 is a flowchart of yet a method for user communication in a live stream room according to another embodiment of the present disclosure. The present solution is an optimization of the above step "determining target secondary users from other participants in a live stream room except the primary user" on the basis of the above solution. Referring to FIG. 3, the method for user communication in a live stream room provided by the present solution includes:

S310, in response to a request for creating a discussion group from a primary user, determining target secondary users from other participants in the live stream room except the primary user.

S320, acquiring user information of the primary user.

Here, the user information refers to information describing the user.

In an embodiment, the user information may be a user portrait tag.

S330, matching the user information of the primary user with user information of the other participants.

S340, determining the target secondary users from the other participants, based on the result of the matching.

In an embodiment, based on the result of the matching, the target secondary users having the same interest with the primary user may be selected from the other participants.

S350, creating the discussion group, with the primary user and a target secondary user who confirms joining as members of the discussion group, and associating thereto a user identification of the primary user, a user identification of the target secondary user who confirms joining, and an identification of the discussion group, to conduct an inner-group discussion among the members of the discussion group on the basis of the discussion group.

Figure 4:
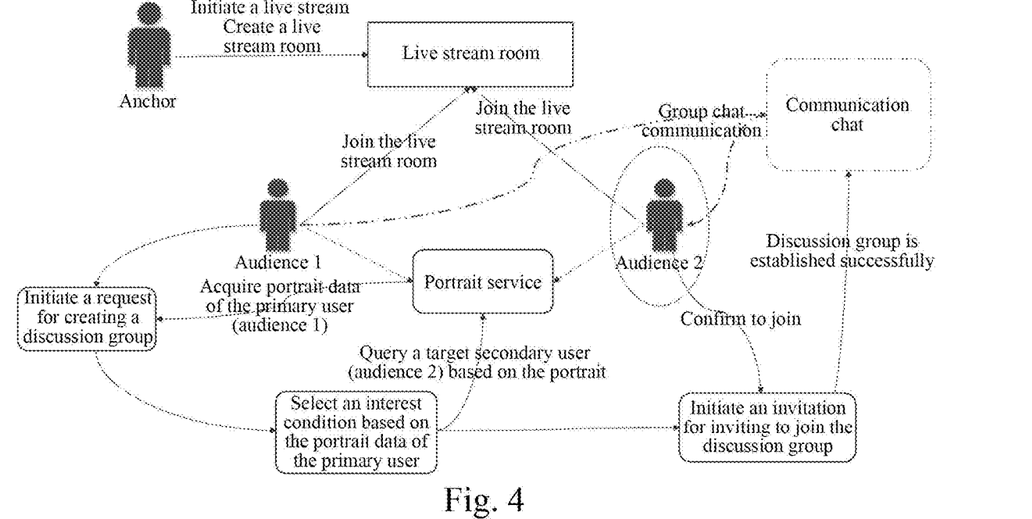
FIG. 4 is a schematic diagram of user communication in a live stream room according to an embodiment of the present disclosure.

The user information being the user portrait tag is used as an example, interaction between users in this solution is shown in FIG. 4.

The present solution matches the user information of the primary user with the user information of the other participants in the live stream room except the primary user, so as to realize automatic selection of the target secondary users with the same or similar user information as the primary user, and further improve the efficiency of determining the target secondary users.

Figure 5:
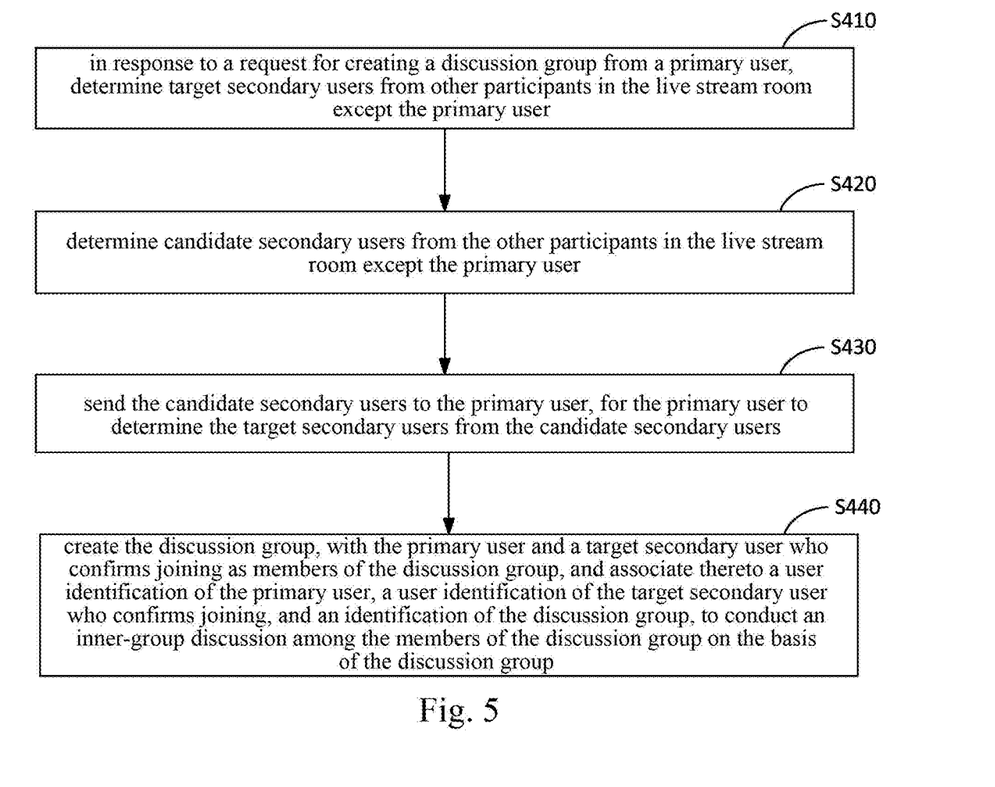
FIG. 5 is a flowchart of yet a method for user communication in a live stream room according to another embodiment of the present disclosure.

FIG. 5 is a flowchart of a method for user communication in a live stream room according to another embodiment of the present disclosure. The present solution is an optimization of the above step "determining target secondary users from other participants in a live stream room except the primary user" on the basis of the above solution. Referring to FIG. 5, the method for user communication in a live stream room provided by the present solution includes:

S410, in response to a request for creating a discussion group from a primary user, determining target secondary users from other participants in the live stream room except the primary user.

S420, determining candidate secondary users from the other participants in the live stream room except the primary user.

Here, the candidate secondary user refers to a user who may be a target secondary user.

S430, sending the candidate secondary users to the primary user, for the primary user to determine the target secondary users from the candidate secondary users.

S440, creating the discussion group, with the primary user and a target secondary user who confirms joining as members of the discussion group, and associating thereto a user identification of the primary user, a user identification of the target secondary user who confirms joining, and an identification of the discussion group, to conduct an inner-group discussion among the members of the discussion group on the basis of the discussion group.

This solution determines the candidate secondary users from the other participants in the live stream room except the primary user, sends the candidate secondary users to the primary user, and determines the target secondary users from the candidate secondary users by the primary user, thereby improving the efficiency of determining the target secondary users.

Figure 6:
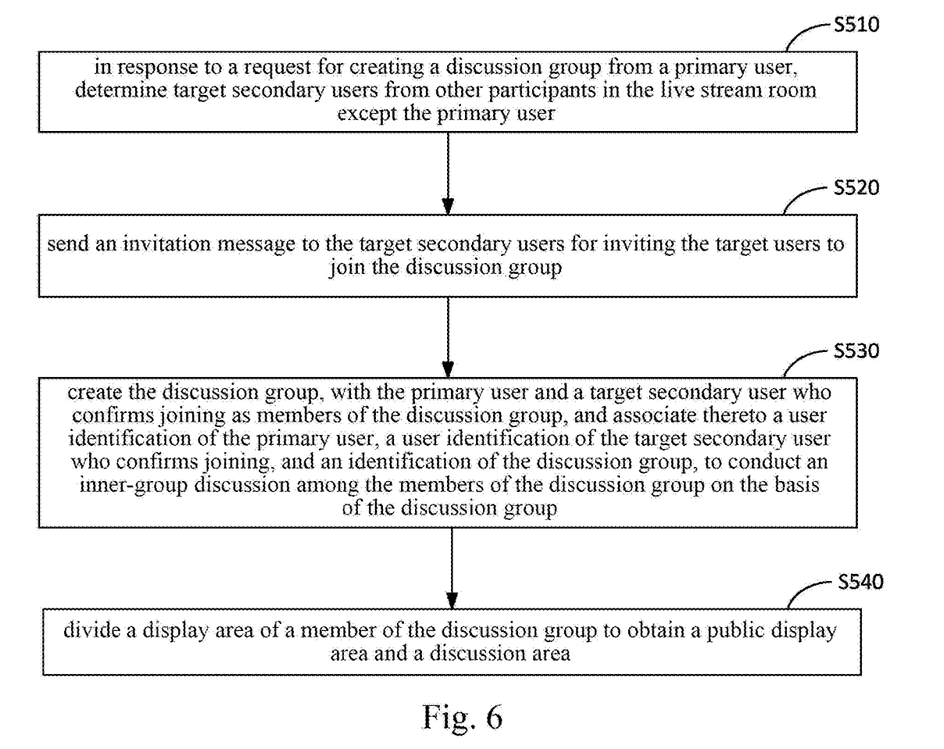
FIG. 6 is a flowchart of a method for user communication in a live stream room according to an embodiment of the present disclosure.

FIG. 6 is a flowchart of a method for user communication in a live stream room according to an embodiment of the present disclosure. The present solution is an extension of the above solutions on the basis of the above solutions. Referring to FIG. 6, the method for user communication in a live stream room provided by the present solution includes:

S510, in response to a request for creating a discussion group from a primary user, determining target secondary users from other participants in the live stream room except the primary user.

S520, sending an invitation message to the target secondary users for inviting the target users to join the discussion group.

S530, creating the discussion group, with the primary user and a target secondary user who confirms joining as members of the discussion group, and associating thereto a user identification of the primary user, a user identification of the target secondary user who confirms joining, and an identification of the discussion group, to conduct an inner-group discussion among the members of the discussion group on the basis of the discussion group.

S540, dividing a display area of a member of the discussion group to obtain a public display area and a discussion area.

Here, the public display area is used for a communication between the members of the discussion group and participants in the live stream room except the members.

The discussion area is used for a communication between a member in the discussion group and other members of the discussion group except the member.

Figure 8:
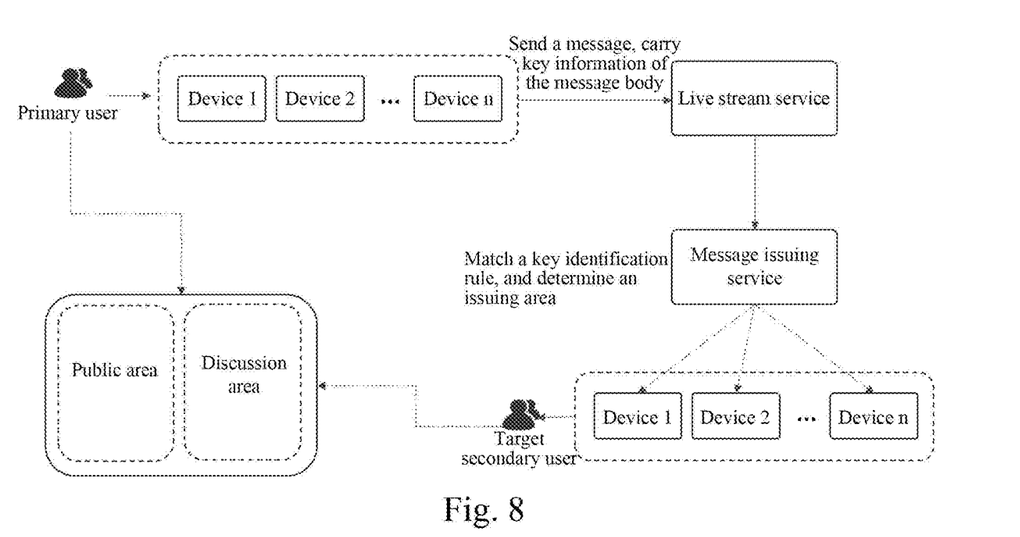
FIG. 8 is a schematic diagram of a division and delivery of message according to an embodiment of the present disclosure.

Refer to FIG. 8 for a logic schematic diagram of a message issuing part in this solution.

The number of public display areas and discussion areas is not limited in embodiments of the present disclosure. Alternatively, there may be one discussion area, two public discussion areas, or more discussion areas.

The number of discussion areas may be determined by the number of discussion groups joined by the member, or may be preset.

For example, if the member joins 3 discussion groups, then the member's client end is divided into 3 discussion areas.

Alternatively, one discussion area may also be associated with a plurality of discussion groups. Based on this one discussion area, communication in different discussion groups may be realized by clicking on different discussion groups.

This solution divides the display area of the members in the discussion group to obtain the public display area and the discussion area, realizing the communication between the members of the discussion group and the participants in the live stream room except the members, and the communication between a member in the discussion group and other members of the discussion group except the member. This solution increases display time of messages by adding the display area, thereby solving the problem of serious information loss caused by based on one display area in the existing technology.

In addition, compared to displaying internal communication information of the discussion group and public communication information of the live stream room in the same display area, this solution may increase display time of the internal communication information and facilitate users to view the internal communication information.

Further, after the dividing a display area of the members in the discussion group to obtain a public display area and a discussion area, the above solution further includes:

in response to a request for sending a message from a member of the discussion group, sending, based on a target display area of the member selected by the member from the public display area and the discussion area, the message to client ends associated with the target display area, and displaying on target display areas of the client ends;

where, if the target display area is the discussion area, the client ends associated with the target display area are client ends of members in the discussion group.

Based on this technical feature, based on the target display area selected by the member from the public display area and the discussion area, this solution sends the message to the client ends associated with the target display area, and displays on the target display areas of the client ends, so that the internal communication information in the discussion area is only visible to the members of the discussion group, thereby improving the privacy of the internal communication information.

This solution is an extension of the above solutions on the basis of the above solutions. The method for user communication in a live stream room provided by this solution includes:

1. A Primary User and a Secondary User Joins a Live Stream Room.

The primary user and the secondary user enter a live stream room of interests through terminal devices. This step involves the process of establishing a connection between a client end and a server end, as detailed below:

This solution takes into account user privacy issues. Under the condition of obtaining an authorization of the primary user and the secondary user, geographic location information of current devices of the primary user and the secondary user is reported, and the server end stores the geographic location information of the primary user and the secondary user after receiving a client connection request, and keeps a regular frequency of heartbeat maintenance to ensure the accuracy of the location information.

Based on the principle of Peano curve filling, the server end stores the two-dimensional geographic location information as a one-dimensional sequential link through a remote dictionary server (i.e., Redis) underlying storage structure, so that the information may be quickly acquired by nearby people later.

Redis is an key-value based open-source database written in ANSIC language, supporting the network, and may be memory-based or persistent, and may provide APIs in a plurality of languages.

This solution is not limited to storing the geographic location information given by the users through Redis, any self-developed or open source storage system that may be used to store and retrieve "nearby" functions.

2. Creating a Discussion Group

The discussion group is created to allow users having similar features or users with custom selection conditions to pay attention to each other's comments and to facilitate communication.

Figure 7:
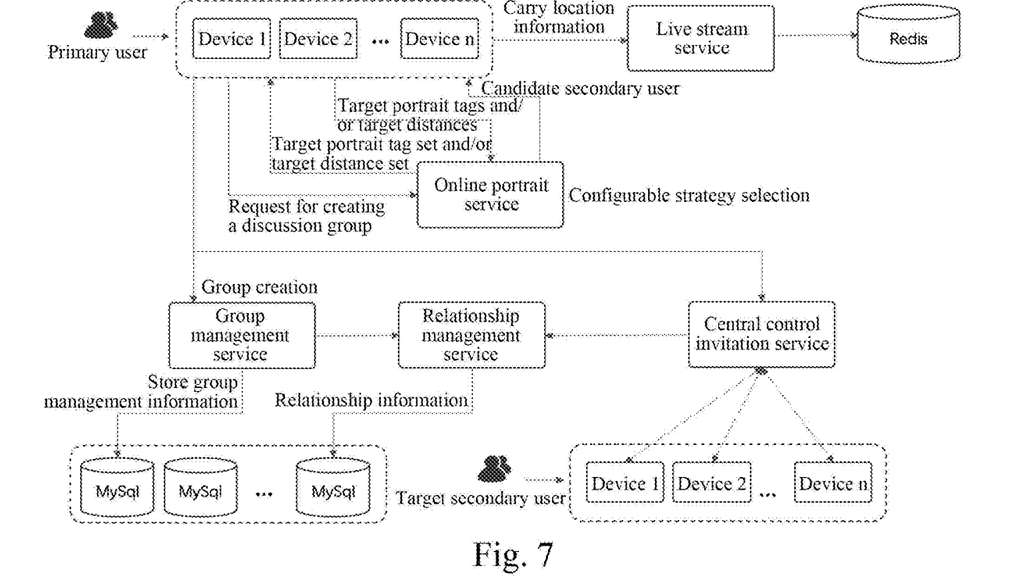
FIG. 7 is a schematic diagram of creating a discussion group according to an embodiment of the present disclosure.

The process involves the following five service modules, a system flowchart is shown in FIG. 7.

(1) Online Portrait Service

Receiving a request for creating a discussion group initiated by the client end, and issuing a user portrait tag and a distance option (such as within 500 meters, within 5 kilometers, within 10 kilometers, or 10 kilometers away) that match the primary user associated with the client end.

Determining at least one candidate secondary user from other participants in the live stream room except the primary user, based on a target portrait tag and a target distance selected by the primary user.

The number of candidate secondary users may be set according to different scenarios, and this solution does not impose any restrictions thereon.

An online portrait service module supports a plurality of selection strategies, by default, randomly selects at least one candidate secondary user that meets the conditions.

If established strategies are determined according to different scenarios (such as: a similarity optimal strategy, or a hottest tag strategy), then the candidate secondary user may be selected according to the established strategy.

(2) Discussion Group Management Service

After determining a target secondary user from the received candidate secondary users, the primary user requests the discussion group management service to create a discussion group. The discussion group management service creates a user group on the server end. In this regard, members of the group include only the primary user. In addition, a three-element relationship mapping of a live stream room identification, a user identification, and a discussion group identification is established.

(3) Central Control Invitation Service receiving a request message for establishing a relationship sent by the primary user, and broadcasting a discussion group joining message to the target secondary user; and receiving a response message feedback from the target secondary user, and if the response message is to agree to join, sending the user identification of the target secondary user to a relationship management service.

(4) Relationship Management Service

Receiving the user identification sent by the target secondary user, and storing this user identification in association with the user identification of the primary user, the identification of the discussion group, and the identification of the live stream room.

(5) Site Clearance Service Module

This solution takes into account the effectiveness of a live stream relationship group. After each live stream ends, the site clearance service may clean up the data relationship storage including group mapping management data and/or relationship storage data, in order to achieve the purpose of reducing storage space usage.

3. Issuing a Message According to Area

On the basis of the established discussion group, when a member of the group sends a message, the message of the member may be displayed according to areas. A schematic diagram is as shown in FIG. 8.

This solution takes into account a user's personalized choice, and provides two modes of sending options as follows:

Mode 1 is whether the sent message may be viewed by the live stream anchor; and

Mode 2 is whether the sent message is displayed in a public area.

When receiving a message sending request of the user, a delivery service module may assign a divided area and a visibility to the message based on the user's option. The logic is as follows:

Logic 1: During the same live stream, a user may only join one discussion group; when the user initiates a new request for creating a discussion group, the relationship management service automatically exits the user from a previous discussion group.

Logic 2: If a user joins the discussion group, messages from the user may be sent to the discussion area by default.

Logic 3: If the public area is selected, the message is sent to the public area, in this regard, regardless of whether a discussion group is joined.

Logic 4: By default, the anchor may view messages in the public area and the discussion area. The option of blocking the anchor is only valid for the discussion area, but not for the public area.

The issue of message involves two core elements:

(1) Message Protocol Reporting Definition:

adding key information for determining a target display area into the message body.

Further, this solution supports the formulation of other logics in a business iteration, and only needs to add a logic to a logic list for judgment as a node.

(2) Message Issuing Service:

Based on the above logics and by analyzing the message protocol, the above key information is extracted from the message body for issuing judgment.

This solution solves the problem of that the messages received are all issued and serious loss of information in the live stream room. Through tag adaptation, division and delivery of message in the private discussion area and the public area, it further simulates a feeling of real live viewing, increases the interaction and intimacy between users, greatly improves product stickiness and is more competitive than competing products.

Figure 9:
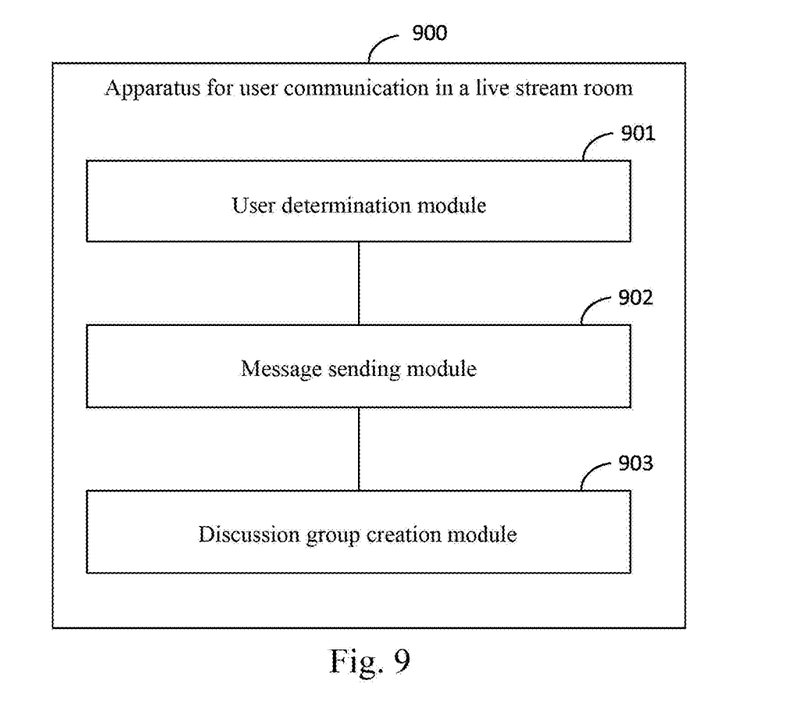
FIG. 9 is a schematic structural diagram of an apparatus for user communication in a live stream room according to an embodiment of the present disclosure.

FIG. 9 is a schematic structural diagram of an apparatus for user communication in a live stream room according to an embodiment of the present disclosure. Referring to FIG. 9, the apparatus 900 for user communication in a live stream room provided by the present embodiment includes: a user determination module 901, a message sending module 902 and a discussion group creation module 903.

The user determination module 901 is configured to determine target secondary users from other participants in the live stream room except the primary user in response to a request for creating a discussion group of a primary user.

The message sending module 902 is configured to send an invitation message to the target secondary users for inviting the target users to join the discussion group.

The discussion group creation module 903 is configured to create the discussion group, with the primary user and a target secondary user who confirms joining as members of the discussion group, and associate thereto a user identification of the primary user, a user identification of a target secondary user who confirms joining, and an identification of the discussion group, to conduct an inner-group discussion among the members of the discussion group on the basis of the discussion group.

In an embodiment of the present disclosure, by determining the target secondary users from the other participants in the live stream room except the primary user, in response to the request for creating a discussion group of the primary user, creating the discussion group, and associating thereto the user identification of the primary user, the user identification of the target secondary user who confirms joining, and the identification of the discussion group, a discussion group including the primary user and the target secondary user who confirms joining is created, then the communication between the members in the group is realized based on the discussion group, and user interaction in the live stream room is improved.

In addition, by determining the target secondary users, and sending the invitation message to the target secondary users to join the discussion group, interruption to a non-target secondary user is avoided.

Further, the user determination module includes:

a tag sending unit, configured to send to the primary user at least one of user portrait tags of the other participants or distance options of the other participants;

a tag receiving unit, configured to receive at least one of target portrait tags or target distances selected by the primary user from the user portrait tags; and a user determination unit, configured to determine the target secondary users from the other participants, based on at least one of the target portrait tags or location information of the primary user, location information of the other participants, and the target distances.

Further, the user determination module includes:

an information acquisition unit, configured to acquire user information of the primary user;

an information matching unit, configured to match the user information of the primary user with user information of the other participants; and the user determination unit is further configured to determine, based on a result of the matching, the target secondary users from the other participants.

Further, the user determination module includes:

a candidate secondary user determination unit, configured to determine candidate secondary users from the other participants in the live stream room except the primary user; and a target secondary user determination unit, configured to send the candidate secondary users to the primary user, for the primary user to determine the target secondary users from the candidate secondary users.

Further, the apparatus further includes:

an area dividing module, configured to, after the creating the discussion group, and associating thereto the user identification of the primary user, the user identification of the target secondary user who confirms joining, and the identification of the discussion group, divide a display area of a member of the discussion group to obtain a public display area and a discussion area;

where, the public display area is used for a communication between the member of the discussion group and participants in the live stream room except the member; and the discussion area is used for a communication between the member of the discussion group and other members of the discussion group except the member.

Further, the apparatus further includes:

a message sending module, configured to, after the dividing the display area of the member of the discussion group to obtain the public display area and the discussion area, in response to a request for sending a message from the member of the discussion group, send the message to client ends associated with the target display area based on a target display area of the member selected by the member from the public display area and the discussion area, and display on target display areas of the client ends;

where, in response to the target display area being the discussion area, the client ends associated with the target display area are client ends of the members of the discussion group.

Further, the apparatus further includes:

a relationship deletion module, configured to, after the creating the discussion group, and associating thereto the user identification of the primary user, the user identification of the target secondary user who confirms joining, and the identification of the discussion group, delete association relationships between the identification of the discussion group and the user identifications of the primary user and the target secondary user who confirms joining in response to the live stream associated with the live stream room ending.

According to an embodiment of the present disclosure, an electronic device and a readable storage medium are provided.

Figure 10:
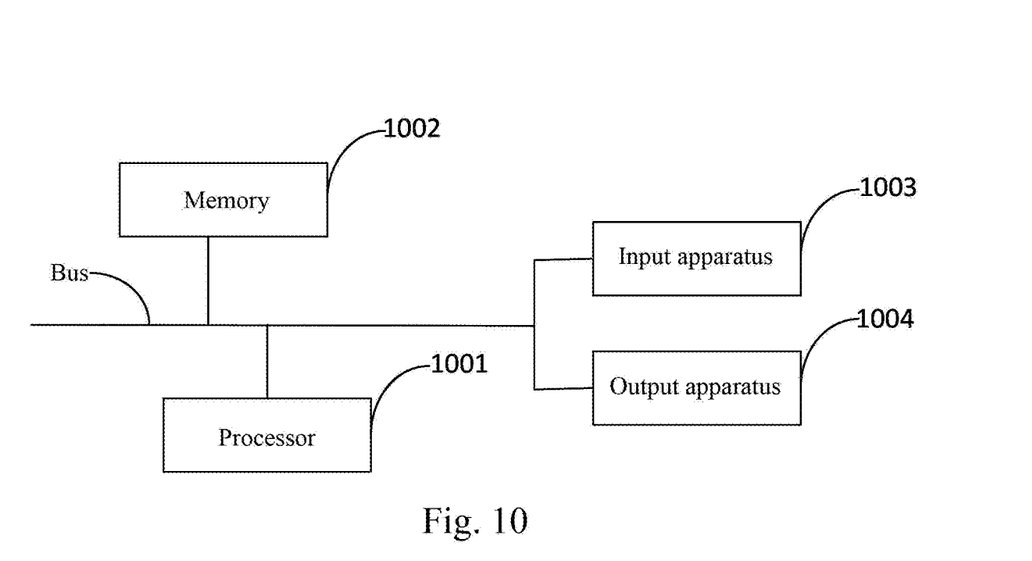
FIG. 10 is a block diagram of an electronic device of the method for user communication in a live stream room according to an embodiment of the present disclosure.

As shown in FIG. 10, illustrated is a block diagram of an electronic device of the method for user communication in a live stream room according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 10, the electronic device includes: one or more processors 1001, a memory 1002, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations, for example, as a server array, a set of blade servers, or a multi-processor system. In FIG. 10, one processor 1001 is used as an example.

The memory 1002 is a non-transitory computer readable storage medium provided by embodiments of the present disclosure. The memory stores instructions executable by at least one processor, so that the at least one processor performs the method for user communication in a live stream room provided by embodiments of the present disclosure. The non-transitory computer readable storage medium of the present disclosure stores computer instructions for causing a computer to perform the method for user communication in a live stream room provided by the present disclosure.

The memory 1002, as a non-transitory computer readable storage medium, may be used to store non-transitory software programs, non-transitory computer executable programs and modules, such as program instructions/modules corresponding to the method for user communication in a live stream room in embodiments of the present disclosure (for example, the user determination module 901, the message sending module 902 and the discussion group creation module 903 as shown in FIG. 9). The processor 1001 executes the non-transitory software programs, instructions, and modules stored in the memory 1002 to execute various functional applications and data processing of the server, that is, to implement the method for user communication in a live stream room in foregoing method embodiments.

The memory 1002 may include a storage program area and a storage data area, where the storage program area may store an operating system and at least one function required application program; and the storage data area may store data created by the use of the electronic device according to the method for user communication in a live stream room, etc. In addition, the memory 1002 may include a high-speed random access memory, and may also include a non-transitory memory, such as at least one magnetic disk storage device, a flash memory device, or other non-transitory solid-state storage devices. In some embodiments, the memory 1002 may optionally include memories remotely provided with respect to the processor 1001, and these remote memories may be connected to the electronic device of the method for user communication in a live stream room through a network. Examples of the above network include but are not limited to the Internet, intranet, local area network, mobile communication network, and combinations thereof.

The electronic device of the method for user communication in a live stream room may further include: an input apparatus 1003 and an output apparatus 1004. The processor 1001, the memory 1002, the input apparatus 1003, and the output apparatus 1004 may be connected through a bus or in other methods. In FIG. 10, connection through a bus is used as an example.

The input apparatus 1003 may receive input digital or character information, and generate key signal inputs related to user settings and function control of the electronic device of the method for user communication in a live stream room, such as touch screen, keypad, mouse, trackpad, touchpad, pointing stick, one or more mouse buttons, trackball, joystick and other input apparatuses. The output apparatus 1004 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

The technology according to the present disclosure improves user interaction in a live stream room.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of embodiments of the present disclosure.

What is claimed is:

1. A method for user communication in a live stream room, the method comprising:
    in response to receiving a client connection request to a live stream, storing, by a processor, a geographic location of a primary user and geographic locations of secondary users through a remote dictionary server (Redis) underlying structure;
    in response to a request for creating a discussion group from the primary user, determining, by the processor, target secondary users from other participants in the live stream room except the primary user, comprising:
        sending, to a terminal device of the primary user, (1) a plurality of user portrait tags and (2) a plurality of distance options, wherein a user portrait tag refers to a hobby, an age range and user gender;

receiving (3) a plurality of target portrait tags selected by the primary user from the plurality of user portrait tags and (4) a plurality of target distances selected by the primary user; and determining the target secondary users from the other participants, based on (3) the selected plurality of target portrait tags and (4) the received plurality of target distances and (5) distances between the primary user and the other participants, the distances between the primary user and the other participants being calculated based on the geographic location of the primary user and the geographic location of the other participants;

sending, by the processor, an invitation message to terminal devices of the target secondary users for inviting the target secondary users to join the discussion group; and creating, by the processor, the discussion group, with the primary user and a target secondary user who confirms joining as members of the discussion group, and associating thereto a user identification of the primary user, a user identification of the target secondary user who confirms joining, and an identification of the discussion group, to conduct an inner-group discussion among the members of the discussion group based on the discussion group.

2. The method according to claim 1, wherein the storing, by the processor, the geographic location of the primary user and the geographic locations of the secondary users through the remote dictionary server (Redis) underlying structure, comprises:

storing, by the processor, a two-dimensional geographic location of the primary user and two-dimensional geographic locations of the secondary users as a one-dimensional sequential link through the Redis underlying structure.

3. The method according to claim 1, wherein the determining the target secondary users from other participants in the live stream room except the primary user, comprises:

determining candidate secondary users from the other participants in the live stream room except the primary user; and sending the candidate secondary users to the terminal device of the primary user, for the primary user to determine the target secondary users from the candidate secondary users.

4. The method according to claim 1, wherein, after the creating the discussion group, and associating thereto the user identification of the primary user, the user identification of the target secondary user who confirms joining, and the identification of the discussion group, the method further comprises:

dividing a display area of the terminal device of a member of the discussion group to obtain a public display area and a discussion area;

wherein, the public display area is used for a communication between the member of the discussion group and participants in the live stream room except the member; and the discussion area is used for a communication between the member of the discussion group and other members of the discussion group except the member.

5. The method according to claim 4, wherein after the dividing the display area of the terminal device of the member of the discussion group to obtain the public display area and the discussion area, the method further comprises:

in response to a request for sending a message from the member of the discussion group:

sending, based on a target display area selected by the member from the public display area and the discussion area of the member, the message to terminal devices of other members associated with the selected target display area, and displaying on target display areas of the terminal devices of the other members, wherein, in response to the target display area being the discussion area, the terminal devices associated with the target display area are terminal devices of the members of the discussion group.

6. The method according to claim 1, wherein, after the creating the discussion group, and associating thereto the user identification of the primary user, the user identification of the target secondary user who confirms joining, and the identification of the discussion group, the method further comprises:

in response to the live stream associated with the live stream room ending, deleting association relationships between the identification of the discussion group and the user identifications of the primary user and the target secondary user who confirms joining.

7. An electronic device, comprising:

at least one processor; and a memory, communicatively connected to the at least one processor; wherein, the memory, storing instructions executable by the at least one processor, the instructions, when executed by the at least one processor, cause the at least one processor to perform operations comprising:

in response to receiving a client connection request to a live stream, storing geographic location of a primary user and geographic locations of secondary users through a remote dictionary server (Redis) underlying structure;

in response to a request for creating a discussion group from the primary user, determining target secondary users from other participants in a live stream room except the primary user, comprising:

sending, to a terminal device of the primary user, (1) a plurality of user portrait tags and (2) a plurality of distance options, wherein a user portrait tag refers to a hobby, an age range and user gender;

receiving (3) a plurality of target portrait tags selected by the primary user from the plurality of user portrait tags and (4) a plurality of target distances selected by the primary user; and determining the target secondary users from the other participants, based on (3) the selected plurality of target portrait tags and (4) the received plurality of target distances and (5) distances between the primary user and the other participants, the distances between the primary user and the other participants being calculated based on the geographic location of the primary user and the geographic location of the other participants;

sending an invitation message to terminal devices of the target secondary users for inviting the target secondary users to join the discussion group; and creating the discussion group, with the primary user and a target secondary user who confirms joining as members of the discussion group, and associating thereto a user identification of the primary user, a user identification of the target secondary user who confirms joining, and an identification of the discussion group, to conduct an inner-group discussion among the members of the discussion group based on the discussion group.

8. The electronic device according to claim 7, wherein the storing the geographic location of the primary user and the geographic locations of the secondary users through the remote dictionary server (Redis) underlying structure, comprises:

storing, by the processor, a two-dimensional geographic location of the primary user and two-dimensional geographic locations of the secondary users as a one-dimensional sequential link through the Redis underlying structure.

9. The electronic device according to claim 7, wherein the determining the target secondary users from other participants in the live stream room except the primary user, comprises:

determining candidate secondary users from the other participants in the live stream room except the primary user; and sending the candidate secondary users to the terminal devices of the primary user, for the primary user to determine the target secondary users from the candidate secondary users.

10. The electronic device according to claim 7, wherein, after creating the discussion group, and associating thereto the user identification of the primary user, the user identification of the target secondary user who confirms joining, and the identification of the discussion group, the operations further comprise:

dividing a display area of the terminal device of a member of the discussion group to obtain a public display area and a discussion area;

wherein, the public display area is used for a communication between the member of the discussion group and participants in the live stream room except the member; and the discussion area is used for a communication between the member of the discussion group and other members of the discussion group except the member.

11. The electronic device according to claim 10, wherein after the dividing the display area of the terminal device of the member of the discussion group to obtain the public display area and the discussion area, the operations further comprise:

in response to a request for sending a message from the member of the discussion group:

sending, based on a target display area selected by the member from the public display area and the discussion area of the member, the message to terminal devices of other members associated with the selected target display area, and displaying on target display areas of the terminal devices of the other members, wherein, in response to the target display area being the discussion area, the terminal devices associated with the target display area are terminal devices of the members of the discussion group.

12. The electronic device according to claim 7, wherein, after the creating the discussion group, and associating thereto the user identification of the primary user, the user identification of the target secondary user who confirms joining, and the identification of the discussion group, the operations further comprise:

in response to the live stream associated with the live stream room ending, deleting association relationships between the identification of the discussion group and the user identifications of the primary user and the target secondary user who confirms joining.

13. A non-transitory computer readable storage medium, storing computer instructions, the computer instructions, when executed by a processor, cause the processor to perform operations comprising:

in response to receiving a client connection request to a live stream, storing geographic location of a primary user and geographic locations of secondary users through a remote dictionary server (Redis) underlying structure;

in response to a request for creating a discussion group from the primary user, determining target secondary users from other participants in a live stream room except the primary user, comprising:

sending, to a terminal device of the primary user, (1) a plurality of user portrait tags and (2) a plurality of distance options, wherein a user portrait tag refers to a hobby, an age range and user gender;

receiving (3) a plurality of target portrait tags selected by the primary user from the plurality of user portrait tags and (4) a plurality of target distances selected by the primary user; and determining the target secondary users from the other participants, based on (3) the selected plurality of target portrait tags and (4) the received plurality of target distances and (5) distances between the primary user and the other participants, the distances between the primary user and the other participants being calculated based on the geographic location of the primary user and the geographic location of the other participants;

sending an invitation message to terminal devices of the target secondary users for inviting the target secondary users to join the discussion group; and creating the discussion group, with the primary user and a target secondary user who confirms joining as members of the discussion group, and associating thereto a user identification of the primary user, a user identification of the target secondary user who confirms joining, and an identification of the discussion group, to conduct an inner-group discussion among the members of the discussion group based on the discussion group.

14. The storage medium according to claim 13, wherein the storing the geographic location of the primary user and the geographic locations of the secondary users through the remote dictionary server (Redis) underlying structure, comprises:

storing, by the processor, a two-dimensional geographic location of the primary user and two-dimensional geographic locations of secondary users as a one-dimensional sequential link through the Redis underlying structure.

15. The storage medium according to claim 13, wherein the determining the target secondary users from other participants in the live stream room except the primary user, comprises:

determining candidate secondary users from the other participants in the live stream room except the primary user; and sending the candidate secondary users to the terminal device of the primary user, for the primary user to determine the target secondary users from the candidate secondary users.

16. The storage medium according to claim 13, wherein, after the creating the discussion group, and associating thereto the user identification of the primary user, the user identification of the target secondary user who confirms joining, and the identification of the discussion group, the operations further comprise:

dividing a display area of the terminal devices of a member of the discussion group to obtain a public display area and a discussion area;

wherein, the public display area is used for a communication between the member of the discussion group and participants in the live stream room except the member; and the discussion area is used for a communication between the member of the discussion group and other members of the discussion group except the member.

17. The storage medium according to claim 16, wherein after the dividing the display area of the terminal device of the member of the discussion group to obtain the public display area and the discussion area, the operations further comprise:

in response to a request for sending a message from the member of the discussion group:

sending, based on a target display area selected by the member from the public display area and the discussion area of the member, the message to terminal devices of other members associated with the selected target display area, and displaying on target display areas of the terminal devices of the other members, wherein, in response to the target display area being the discussion area, the terminal devices associated with the target display area are terminal devices of the members of the discussion group.

* * * * *